(12) United States Patent
Mori et al.

(10) Patent No.: US 8,225,661 B2
(45) Date of Patent: Jul. 24, 2012

(54) EXTERNAL-FORCE DETECTING APPARATUS AND METHOD OF DETECTING LINE BREAK

(75) Inventors: Akira Mori, Nagaokakyo (JP);
Yoshitaka Kato, Nagaokakyo (JP);
Satoshi Ichihara, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 12/944,045

(22) Filed: Nov. 11, 2010

(65) Prior Publication Data

US 2011/0056293 A1    Mar. 10, 2011

Related U.S. Application Data

(63) Continuation of application No. PCT/JP2009/057769, filed on Apr. 17, 2009.

(30) Foreign Application Priority Data

Jun. 10, 2008    (JP) ................................. 2008-152080

(51) Int. Cl.
*G01C 19/56*    (2006.01)
(52) U.S. Cl. .................................................. 73/504.12
(58) Field of Classification Search ................ 73/504.12
See application file for complete search history.

(56) References Cited

U.S. PATENT DOCUMENTS

| | | | | |
|---|---|---|---|---|
| 5,902,931 | A * | 5/1999 | Mori et al. ................. | 73/504.12 |
| 6,167,744 | B1 * | 1/2001 | Akimoto et al. ............. | 73/1.37 |
| 6,343,498 | B1 | 2/2002 | Oba et al. | |
| 6,418,790 | B1 | 7/2002 | Yukawa et al. | |
| 6,553,835 | B1 * | 4/2003 | Hobbs et al. ................ | 73/514.16 |
| 7,124,632 | B2 * | 10/2006 | Smith ......................... | 73/504.02 |
| 2002/0017135 | A1 | 2/2002 | Mori et al. | |
| 2003/0151934 | A1 | 8/2003 | Kitamura | |
| 2005/0066726 | A1 | 3/2005 | Mochida | |
| 2006/0123908 | A1 | 6/2006 | Ito | |

(Continued)

FOREIGN PATENT DOCUMENTS

EP    1 367 367 A1    12/2003

(Continued)

OTHER PUBLICATIONS

Official Communication issued in International Patent Application No. PCT/JP2009/057769, mailed on May 26, 2009.

*Primary Examiner* — Hezron E Williams
*Assistant Examiner* — Gregory J Redmann
(74) *Attorney, Agent, or Firm* — Keating & Bennett, LLP

(57) ABSTRACT

An external-force detecting apparatus includes at least one drive line connecting the corresponding drive electrodes to a driving unit and at least one monitor line connecting the corresponding monitor electrodes to the driving unit. The driving unit outputs a drive signal to the at least one of the drive electrodes through the at least one of the drive lines to drive an oscillator and performs automatic gain control to the level of the drive signal based on the oscillation state of the oscillator acquired from the at least one of the monitor electrodes through the at least one of the monitor lines. The external-force detecting apparatus further includes a switching circuit arranged to switch between connection and disconnection of an electric path between the oscillator and the driving unit via at least one of the drive lines or the multiple monitor lines.

6 Claims, 10 Drawing Sheets

U.S. PATENT DOCUMENTS

2007/0144256 A1 * 6/2007 Mori et al. ............... 73/504.12

FOREIGN PATENT DOCUMENTS

| | | |
|---|---|---|
| JP | 59-099365 A | 6/1984 |
| JP | 05-264279 A | 10/1993 |
| JP | 2000-146590 A | 5/2000 |
| JP | 2001-056224 A | 2/2001 |
| JP | 2001-194256 A | 7/2001 |
| JP | 2002-013930 A | 1/2002 |
| JP | 2002-188921 A | 7/2002 |
| JP | 2002-267448 A | 9/2002 |
| JP | 2003-240810 A | 8/2003 |
| JP | 2004-191189 A | 7/2004 |
| JP | 2005-106550 A | 4/2005 |
| JP | 2006-170620 A | 6/2006 |

* cited by examiner

FIG. 5

```
START
  ↓
S10 DRIVE OSCILLATOR
  ↓
S20 MEASURE AMPLITUDE OF DRIVE SIGNAL
  ↓
S30 TURN OFF SWITCH TO DISCONNECT ELECTRIC PATH
  ↓
S40 MEASURE AMPLITUDE OF DRIVE SIGNAL
  ↓
S50 DETECT LINE BREAK ON THE BASIS OF AMPLITUDE OF DRIVE SIGNAL BEFORE AND AFTER DISCONNECTION OF ELECTRIC PATH
  ↓
END
```

FIG. 6

| BROKEN PART | DRIVE SIGNAL LEVEL | | CONTENT OF CHANGE |
|---|---|---|---|
| | BEFORE OFF | AFTER OFF | |
| LD1(Vdr1) | 4/3 | 2 | 3/2 TIMES |
| LD2(Vdr2) | 4/3 | 2 | 3/2 TIMES |
| LD3(Vdr3) | 4/3 | 2 | 3/2 TIMES |
| LD4(Vdr4) | 4/3 | 4/3 | NO CHANGE |
| NONE | 1 | 4/3 | 4/3 TIMES |

FIG. 7

| BROKEN PART | DRIVE SIGNAL LEVEL | | CONTENT OF CHANGE |
|---|---|---|---|
| | BEFORE OFF | AFTER OFF | |
| LM1 | 2 | 0 | NO OUTPUT |
| LM2 | 2 | 2 | NO CHANGE |
| NONE | 1 | 2 | TWICE |

FIG. 9

| BROKEN PART | DRIVE SIGNAL LEVEL | | CONTENT OF CHANGE |
|---|---|---|---|
| | BEFORE OFF | AFTER OFF | |
| LD1(Vdr1) | 4/3 | 4 | THREE TIMES |
| LD2(Vdr2) | 4/3 | 4 | THREE TIMES |
| LD3(Vdr3) | 4/3 | 2 | 3/2 TIMES |
| LD4(Vdr4) | 4/3 | 2 | 3/2 TIMES |
| NONE | 1 | 2 | TWICE |

FIG. 10

| BROKEN PART | DRIVE SIGNAL LEVEL | | CONTENT OF CHANGE |
|---|---|---|---|
| | BEFORE OFF | AFTER OFF | |
| LD1(Vdr1) | 4/3 | 0 | NO OUTPUT |
| LD2(Vdr2) | 4/3 | 4 | THREE TIMES |
| LD3(Vdr3) | 4/3 | 4 | THREE TIMES |
| LD4(Vdr4) | 4/3 | 4 | THREE TIMES |
| NONE | 1 | 4 | FOUR TIMES |

FIG. 11

| BROKEN PART | DRIVE SIGNAL LEVEL | | CONTENT OF CHANGE |
|---|---|---|---|
| | BEFORE OFF | AFTER OFF | |
| LD1(Vdr1) | 4/3 | 2 | 3/2 TIMES |
| LD2(Vdr2) | 4/3 | 4/3 | 3/2 TIMES |
| LD3(Vdr3) | 4/3 | 2 | 3/2 TIMES |
| LD4(Vdr4) | 4/3 | 2 | NO CHANGE |
| NONE | 1 | 4/3 | 4/3 TIMES |

| BROKEN PART | DRIVE SIGNAL LEVEL | | CONTENT OF CHANGE |
| --- | --- | --- | --- |
| | BEFORE OFF | AFTER OFF | |
| LD1 | 2 | 0 | NO OUTPUT |
| LD3 | 2 | 2 | NO CHANGE |
| NONE | 1 | 2 | TWICE |

US 8,225,661 B2

EXTERNAL-FORCE DETECTING APPARATUS AND METHOD OF DETECTING LINE BREAK

BACKGROUND OF THE INVENTION

1. Field of the Invention

The present invention relates to an external-force detecting apparatus used to detect, for example, an angular velocity and a method of detecting line break for the external-force detecting apparatus.

2. Description of the Related Art

Recently, vibrating gyroscopes have been used to detect the orientation of a vehicle, to detect the traveling direction of a navigation apparatus, to correct motion blur of a camera caused by hand shake, to operate the virtual reality, and to perform other suitable functions. As an example of such a vibrating gyroscope, for example, Japanese Unexamined Patent Application Publication No. 2006-170620 (Japanese Unexamined Patent Application Publication No. 2006-170620) discloses the following gyro sensor. Two drive signals defined by sine waves having opposite phases are applied to two respective drive electrodes in a sensing element in order to drive a movable electrode. The variation in capacitance of two monitor electrodes arranged to monitor the vibrating state of the sensing element is converted into two respective monitor signals by a capacitance voltage (CV) converter and the two monitor signals are supplied to a variable gain amplifier. The variable gain amplifier controls the conversion factor in voltage-current conversion so that the two monitor signals have a certain amplitude.

With the gyro sensor described in Japanese Unexamined Patent Application Publication No. 2006-170620, for example, if either of the two lines connecting a drive buffer and the drive electrodes is broken, the sensing element can be normally driven. Specifically, for example, if either of the two lines connecting the drive buffer and the drive electrodes is broken, the amplitude of the drive signals is reduced by half and the drive level of the sensing element is also reduced by half. In addition, the amplitude of the two monitor signals supplied to the variable gain amplifier is reduced by half. Since the variable gain amplifier doubles the conversion factor in the voltage-current conversion, that is, doubles the amplitude of the drive signals applied to the drive electrodes so that the monitor signals have a certain value, the sensing element is normally driven. Accordingly, the gyro sensor described in Japanese Unexamined Patent Application Publication No. 2006-170620 has a problem in that it is not possible to detect when a line connecting the drive buffer to the drive electrodes is breaks.

SUMMARY OF THE INVENTION

In order to overcome the problems described above, preferred embodiments of the present invention provide an external-force detecting apparatus and a method of detecting line break that is capable of correctly detecting when a line connected to an oscillator breaks.

An external-force detecting apparatus according to a preferred embodiment of the present invention includes an oscillator including at least one drive electrode and at least one monitor electrode, and at least one of the at least one drive electrode and the at least one monitor electrode includes a plurality of drive electrodes or a plurality of monitor electrodes, a driving unit arranged to drive the oscillator, at least one drive line provided for each of the at least one drive electrode and arranged to connect the corresponding drive electrodes to the driving unit, and at least one monitor line provided for each of the at least one monitor electrode and arranged to connect the corresponding monitor electrodes to the driving unit. The driving unit outputs a drive signal to the at least one drive electrode through the drive line to drive the oscillator and performs automatic gain control to a level of the drive signal based on the oscillation state of the oscillator acquired from the at least one monitor electrode through the monitor line. The external-force detecting apparatus further includes a first switching circuit arranged to switch between connection and disconnection of an electrical path between the oscillator and the driving unit via the drive lines or the monitor lines connected to the plurality of drive electrodes or the plurality of monitor electrodes of the at least one of the at least one drive electrode and the at least one monitor electrode that includes the plurality of drive electrodes or the plurality of monitor electrodes.

The oscillator preferably includes a plurality of drive electrodes and a plurality of monitor electrodes. The first switching circuit preferably switches between connection and disconnection of an electric path between the oscillator and the driving unit via at least one of the plurality of drive lines. The external-force detecting apparatus preferably further includes a second switching circuit arranged to switch between connection and disconnection of an electric path between the oscillator and the driving unit via at least one of the plurality of monitor lines.

The oscillator preferably includes N drive electrodes or N monitor electrodes where N is a natural number that is not less than two. The first switching circuit is preferably arranged to switch between connection and disconnection of an electric path between the oscillator and the driving unit via N-lines, among the drive lines or the monitor lines of the N drive electrodes or the N monitor electrodes.

The first switching circuit preferably includes a switch arranged to switch between connection and disconnection of the electric path.

The drive lines and the monitor lines are preferably defined by wire bonding.

In order to resolve the above problems, a method of detecting line break according to another preferred embodiment of the present invention in an external-force detecting apparatus including an oscillator including at least one drive electrode and at least one monitor electrode, and at least one of the at least one drive electrode and the at least one monitor electrode includes a plurality of drive electrodes or a plurality of monitor electrodes, a driving unit arranged to drive the oscillator, at least one drive line provided for each of the at least one drive electrode and arranged to connect the at least one drive electrode to the driving unit, and at least one monitor line provided for each of the at least one monitor electrode and arranged to connect the at least one monitor electrode to the driving unit includes the steps of outputting a drive signal to the at least one drive electrode through the at least one drive line to drive the oscillator and performing automatic gain control to the level of the drive signal based on the oscillation state of the oscillator acquired from the at least one monitor electrode through the monitor line by the driving unit, measuring the level of the drive signal, disconnecting an electric path between the oscillator and the driving unit via the drive lines or the monitor lines connected to the plurality of drive electrodes or the plurality of monitor electrodes of the at least one of the at least one drive electrode and the at least one monitor electrode that includes a plurality of electrodes, measuring the level of the drive signal after the disconnection of the electric path, and detecting a break of one of the drive lines or the monitor lines connected to the plurality of drive electrodes or the plurality of monitor electrodes of the at least one of the at least one drive electrode and the at least one monitor electrode that includes the plurality of drive electrodes or the plurality of monitor electrodes based on a level of the drive signal measured before and after the disconnection of the electric path.

According to various preferred embodiments of the present invention, it is possible to accurately detect break of a line connected to an oscillator.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5 is a flowchart showing an operational process when the external-force detecting apparatus according to the first preferred embodiment of the present invention detects the break of a line.

FIG. 6 is a diagram showing the relationship between broken drive lines and the levels of a drive signal.

FIG. 7 is a diagram showing the relationship between broken monitor lines and the levels of the drive signal.

FIG. 9 is a diagram showing the relationship between broken drive lines and the levels of the drive signal.

FIG. 10 is a diagram showing the relationship between broken drive lines and the levels of the drive signal, which shows an example of a method of determining which of the drive lines LD1 and LD2 is broken after the detection of the break shown in FIG. 9 is performed.

FIG. 11 is a diagram showing the relationship between broken drive lines and the levels of the drive signal, which shows another example of the method of determining which of the drive lines LD1 and LD2 is broken after the detection of the break shown in FIG. 9 is performed.

DETAILED DESCRIPTION OF THE PREFERRED EMBODIMENTS

Figure 1:
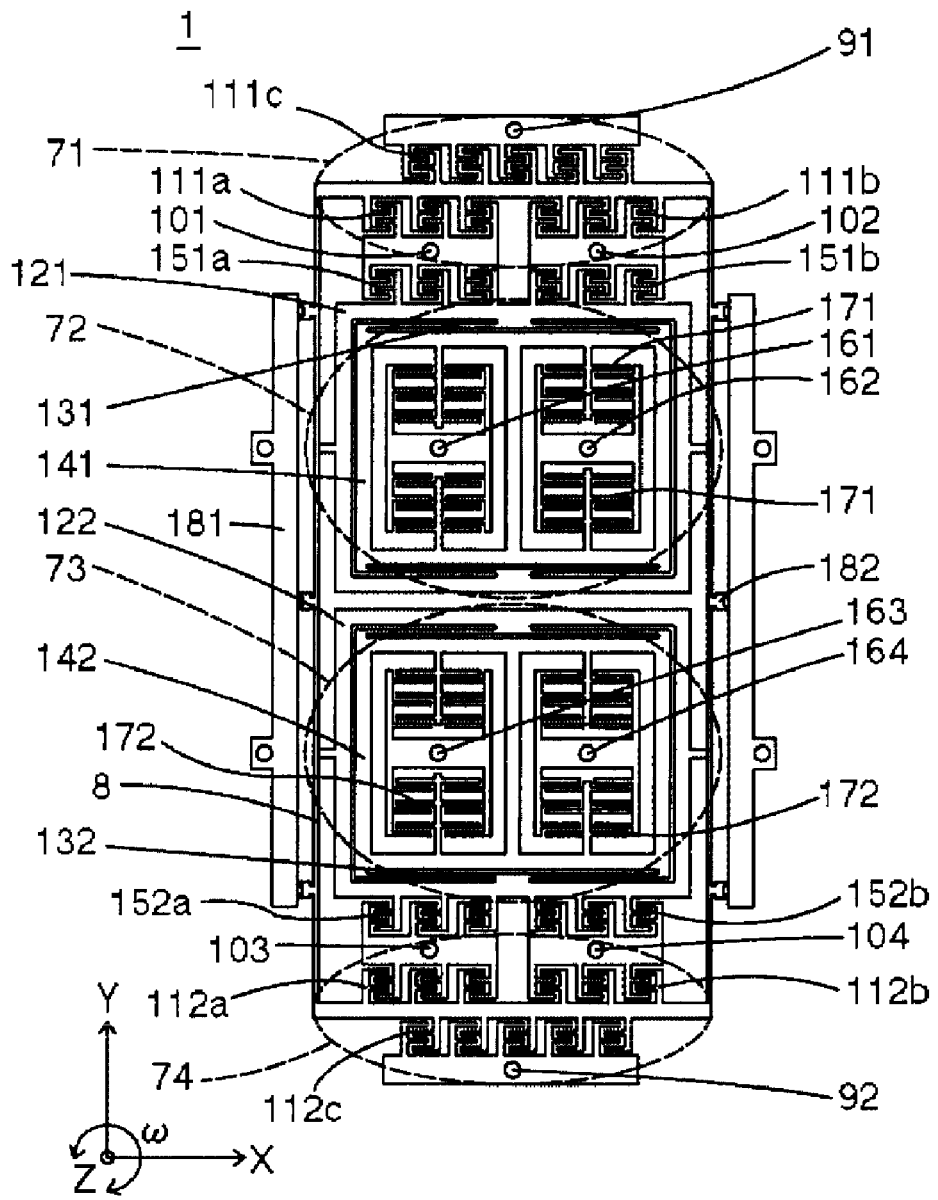
FIG. 1 is a plan view showing an oscillator used in an external-force detecting apparatus according to a first preferred embodiment of the present invention.

Preferred embodiments of the present invention will be described with reference to the attached drawings. The same reference numerals are used to identify the same or equivalent components in the drawings. A description of such components is not repeated.

First Preferred Embodiment

Figure 2:
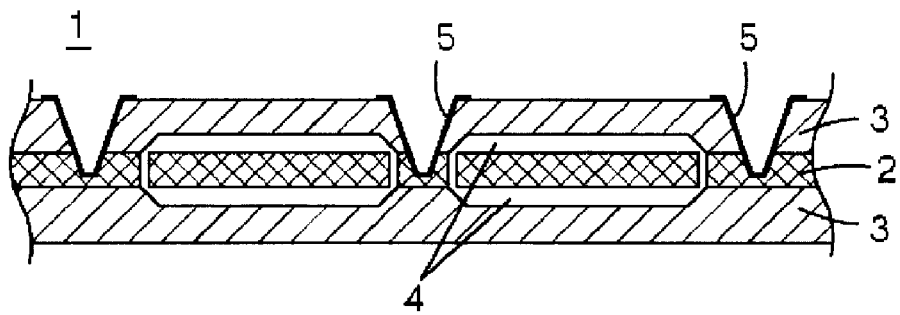
FIG. 2 is a cross-sectional view showing a portion of in which an oscillator base and protection bases are connected to one another.

FIG. 1 is a plan view showing an oscillator used in an external-force detecting apparatus according to a first preferred embodiment of the present invention. FIG. 2 is a cross-sectional view showing a portion in which an oscillator base and protection bases are connected to one another.

The external-force detecting apparatus according to the first preferred embodiment of the present invention includes an oscillator 1 that functions as an angular velocity detecting element. The oscillator 1 is preferably an electrostatic drive/capacitance detection type oscillator and includes an oscillator base 2 preferably made of, for example, a monocrystal or polycrystal low-resistance silicon material and protection bases 3 that are provided on the main surface and the rear surface of the oscillator base 2 and that are preferably made of, for example, a high-resistance silicon material or glass material. Both of the bases 2 and 3 are integrally connected by a coupling method, such as anode coupling, for example, except the portions in which cavities 4 are provided to ensure free movement of the movable portions of the oscillator base 2. The cavities 4 are maintained in a vacuum state or a low-pressure state in order to reduce vibration damping.

The oscillator base 2 is subjected to microfabrication, such as etching, for example, so as to include first to fourth mass portions 71 to 74, a drive beam 8, first and second monitor electrodes 91 and 92, first to fourth drive electrodes 101 to 104, first to fourth detection electrodes 161 to 164, ground electrodes 181 and 182, and other components formed thereon.

Referring to FIG. 1, the first to fourth mass portions 71 to 74 are supported in series by the drive beam 8, which is partially connected to the ground electrodes 181 and 182, in the Y-axis direction and, thus, the first to fourth mass portions 71 to 74 are arranged so as to be capable of oscillating in the X-axis direction, where the longitude direction of the oscillator 1 is the Y-axis direction, the latitude direction perpendicular to the Y-axis direction is the X-axis direction, and the direction that is perpendicular to the Y-axis direction and the X-axis direction and that is perpendicular to the surface of the page in FIG. 1 is the Z-axis direction. In other words, the first to fourth mass portions 71 to 74 and the drive beam 8 are movable portions, and the first and second monitor electrodes 91 and 92, the first to fourth drive electrodes 101 to 104, and the ground electrodes 181 and 182 are fixed portions.

Interdigital movable-side electrodes 111a, 111b, and 111c extending in the X-axis direction are arranged in the first mass portion 71 so as to oppose the interdigital portions of the first monitor electrode 91 and the first and second drive electrodes 101 and 102.

The second mass portion 72 includes a substantially rectangular first drive frame 121 that is supported by the drive beam 8 and a first detection frame 141 that is supported by upper and lower first detection beams 131 inside the first drive frame 121 and that includes two substantially rectangular shaped portions. Interdigital movable-side electrodes 151a and 151b are provided outside the first drive frame 121 so as to be close to the first mass portion 71 and so as to oppose the interdigital portions of the first and second drive electrodes 101 and 102. Interdigital movable-side electrodes 171 are provided inside the two substantially rectangular shape portions of the first detection frame 141 so as to oppose the interdigital first and second detection electrodes 161 and 162. Accordingly, the first detection frame 141 is in a state in which the first detection frame 141 is capable of being oscillated in the Y-axis direction by the first detection beams 131 along with the movable-side electrodes 171.

Interdigital movable-side electrodes 112a, 112b, and 112c extending in the X-axis direction are provided in the fourth mass portion 74 so as to oppose the interdigital portions of the second monitor electrode 92 and the third and fourth drive electrodes 103 and 104.

The third mass portion 73 includes a substantially rectangular second drive frame 122 supported by the drive beam 8 and a second detection frame 142 that is supported by upper and lower second detection beams 132 inside the second drive frame 122 and that includes two rectangular shaped portions. Interdigital movable-side electrodes 152a and 152b are provided outside the second drive frame 122 so as to be close to the fourth mass portion 74 and so as to oppose the interdigital portions of the third and fourth drive electrodes 103 and 104. Interdigital movable-side electrodes 172 are formed inside the two rectangles of the second detection frame 142 so as to oppose the interdigital third and fourth detection electrodes 163 and 164. Accordingly, the second detection frame 142 is in a state in which the second detection frame 142 is capable of being oscillated in the Y-axis direction by the second detection beams 132 along with the movable-side electrodes 172.

The first and second monitor electrodes 91 and 92, the first to fourth drive electrodes 101 to 104, the first to fourth detection electrodes 161 to 164, and the ground electrodes 181 and 182 described above are formed on the portions above the oscillator base 2, where the oscillator base 2 and the protection base 3 are connected, and are in a fixed state. These fixed-side electrodes 91 and 92, 101 to 104, 161 to 164, and 181 and 182 are individually connected to electrode pads 5 as shown in FIG. 2 and are capable of being electrically connected to an external electric circuit described below via the respective electrode pads 5. The movable portions of the oscillator 1 are mechanically and electrically connected to the ground electrodes 181 and 182 via the drive beam 8 so as to be maintained at a ground potential.

Figure 3:
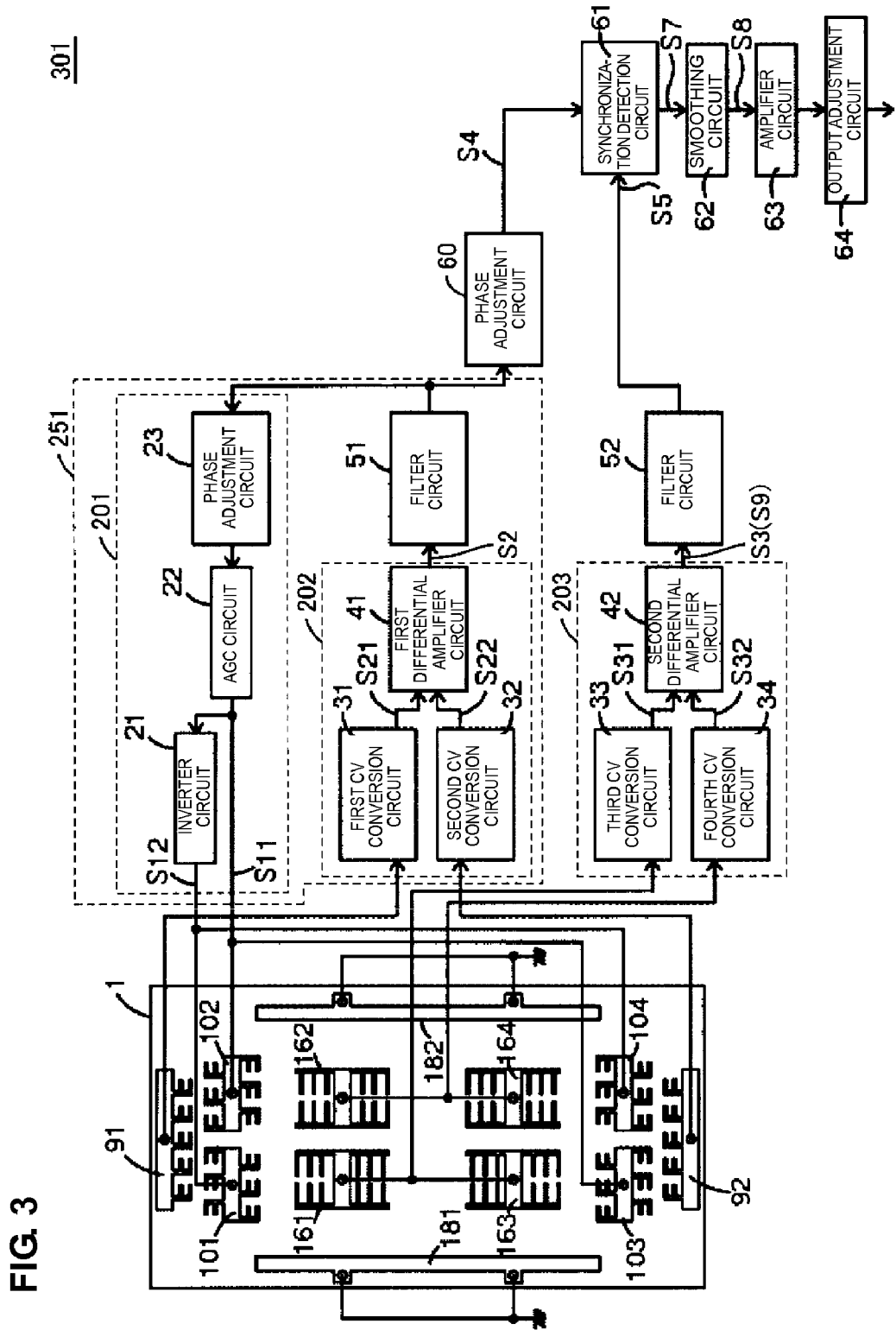
FIG. 3 is a block diagram showing the circuit configuration of the external-force detecting apparatus according to the first preferred embodiment of the present invention.

FIG. 3 is a block diagram showing the circuit configuration of the external-force detecting apparatus according to the first preferred embodiment of the present invention.

Referring to FIG. 3, an external-force detecting apparatus 301 is, for example, a vibrating gyroscope. The external-force detecting apparatus 301 includes the oscillator 1, a driving unit 251, a detection circuit portion 203, a filter circuit 52, a phase adjustment circuit 60, a synchronization detection circuit 61, a smoothing circuit 62, an amplifier circuit 63, and an output adjustment circuit 64. The driving unit 251 includes a drive circuit portion 201, a detection circuit portion 202, and a filter circuit 51. The drive circuit portion 201 includes an inverter circuit 21, an automatic gain control (AGC) circuit 22, and a phase adjustment circuit 23. The detection circuit portion 202 includes a first CV conversion circuit 31, a second CV conversion circuit 32, and a first differential amplifier circuit 41. The detection circuit portion 203 includes a third CV conversion circuit 33, a fourth CV conversion circuit 34, and a second differential amplifier circuit 42.

The first monitor electrode 91 is connected to the first CV conversion circuit 31, and the second monitor electrode 92 is connected to the second CV conversion circuit 32. Both of the first and second CV conversion circuits 31 and 32 are connected to the first differential amplifier circuit 41, and the first differential amplifier circuit 41 is connected to the AGC circuit 22 via the filter circuit 51 and the phase adjustment circuit 23. The output of the first differential amplifier circuit 41 is connected to the input portion of the phase adjustment circuit 60 described below via the filter circuit 51. The output portion of the AGC circuit 22 is connected to the second drive electrode 102 and the third drive electrode 103 and is also connected to the first drive electrode 101 and the fourth drive electrode 104 via the inverter circuit 21.

In contrast, both of the first detection electrode 161 and the third detection electrode 163 are connected to the third CV conversion circuit 33, and both of the second detection electrode 162 and the fourth detection electrode 164 are connected to the fourth CV conversion circuit 34. Both of the third and fourth CV conversion circuits 33 and 34 are connected to the second differential amplifier circuit 42. The second differential amplifier circuit 42 is connected to the input portion of the synchronization detection circuit 61 described below via the filter circuit 52.

For example, charge amplifier circuits or impedance conversion circuits are provided as the first to fourth CV conversion circuits 31 to 34. For example, operational amplifiers are provided as the first and second differential amplifier circuits 41 and 42.

The phase adjustment circuit 60 adjusts the phase of an output signal from the filter circuit 51 and supplies the output signal to the synchronization detection circuit 61 as a detection reference signal S4.

The synchronization detection circuit 61 performs phase detection of a detection signal S5 in synchronization with the detection reference signal S4. The smoothing circuit 62 and the amplifier circuit 63 are sequentially connected to the synchronization detection circuit 61.

Next, the operation of the external-force detecting apparatus according to the first preferred embodiment of the present invention will be described.

A drive signal S12 resulting from an inversion of the level of a drive signal S11 output from the AGC circuit 22 by the inverter circuit 21 is supplied to the first and fourth drive electrodes 101 and 104. The drive signal S11 output from the AGC circuit 22 is directly supplied to the second and third drive electrodes 102 and 103. In this case, both of the drive signals S11 and S12 are preferably alternating current signals having opposite levels with respect to the ground potential, for example, an offset voltage of about +2.5 V.

Accordingly, if the drive signal S12 is at a high level and the drive signal S11 is at a low level, the electrostatic attraction between the first and fourth drive electrodes 101 and 104 and the movable-side electrodes 111a, 151a, 112b, and 152b opposing the electrodes 101 and 104 is in a "strong" state while the electrostatic attraction between the second and third drive electrodes 102 and 103 and the movable-side electrodes 111b, 151b, 112a, and 152a opposing the electrodes 102 and 102 are in a "weak" state. If the drive signal S12 is at the low level and the drive signal S11 is at the high level, then the states of the electrostatic attraction are inverted. Accordingly, the difference in the electrostatic attraction causes the mass portions that are adjacent to each other, among the first to fourth mass portions 71 to 74, to be driven and oscillated in opposite phases in the X-axis direction.

The capacitance between the movable-side electrode 111c and the first monitor electrode 91 provided in the first mass portion 71 and the capacitance between the movable-side electrode 112c and the second monitor electrode 92 provided in the fourth mass portion 74 are varied depending on the oscillation described above.

The variations in the capacitance in the first and second monitor electrodes 91 and 92 arranged to monitor the drive state and oscillation state of the oscillator 1 in the X-axis direction are converted into monitor signals S21 and S22, each having the voltage level corresponding to the variation in the capacitance by the first and second CV conversion circuits 31 and 32, respectively. In this case, since both of the monitor signals S21 and S22 have opposite phases, the monitor signals S21 and S22 are amplified and converted into one monitor signal S2 downstream in the first differential amplifier circuit 41.

The monitor signal S2 is subjected to noise reduction in the filter circuit 51 to remove unwanted noise components. Then, the monitor signal S2 is supplied to the phase adjustment circuit 60 and is subjected to phase adjustment necessary for self-oscillation in the phase adjustment circuit 23 to be supplied to the AGC circuit 22. The AGC circuit 22 automatically adjusts the gain of the AGC circuit 22 so that a signal input into the AGC circuit 22 has a substantially constant amplitude. Accordingly, the drive signals S11 and S12 having an appropriate amplitude are constantly supplied to the first to fourth drive electrodes 101 to 104.

The drive signals S11 and S12 are generated from the monitor signal S2 acquired in the first and second monitor electrodes 91 and 92 and are applied to the first to fourth drive electrodes to provide a closed loop self-oscillating circuit. The oscillator 1 keeps oscillating at a resonant frequency that is equal or substantially equal to the frequency of the drive signals.

Upon application of a rotation angular velocity around the Z axis to the oscillator 1 in this state, a Coriolis force in the Y-axis direction perpendicular or substantially perpendicular to the oscillation direction is generated in each of the mass portions 71 to 74. The first and second detection frames 141 and 142 that are supported by the first and second detection beams 131 and 132, respectively, are driven in opposite directions along the Y-axis direction by the Coriolis force and oscillate at the same frequency as that of the drive and oscillation in the X-axis direction. The capacitance between the movable-side electrode 171 and the first and second detection electrodes 161 and 162 provided in the first detection frame and the capacitance between the movable-side electrode 172 and the third and fourth detection electrodes 163 and 164 provided in the second detection frame vary depending on the oscillation.

A Coriolis force F generated upon application of an angular velocity is expressed by the following equation:

$$F = 2 \times M \times \omega \times v$$

where M denotes the entire mass of the first to fourth mass portions 71 to 74, ω denotes an angular velocity, and v denotes the entire oscillation velocity of the first to fourth mass portions 71 to 74 that are driven.

Since the structural resonance frequency in the Y-axis direction of the oscillator 1 is sufficiently different from the oscillation frequency when the oscillator 1 is driven in the X-axis direction by the drive signals in the non-resonant type oscillator 1, the oscillation in the Y-axis direction caused by the Coriolis force differs in phase by about 90° from the drive and oscillation in the X-axis direction when the oscillator 1 is driven by the drive signals S11 and S12. Accordingly, upon an occurrence of an oscillation in the Y-axis direction in a state in which the oscillator 1 is driven and is being oscillated in the X-axis direction, the first to fourth mass portions 71 to 74 oscillate in an elliptical motion. Accordingly, the variation in capacitance caused in the first and second monitor electrodes 91 and 92 in conjunction with the drive and oscillation differs in phase from the variation in capacitance caused in each of the first to fourth detection electrodes 161 to 164 in conjunction with the oscillation caused by the Coriolis force by about 90°.

In contrast, the variation in capacitance caused in the first and third detection electrodes 161 and 163 in conjunction with the oscillation caused by the Coriolis force is converted into a detection signal S31 having a voltage level corresponding to the variation in capacitance by the third CV conversion circuit 33. Similarly, the variation in capacitance caused in the second and fourth detection electrodes 162 and 164 in conjunction with the oscillation caused by the Coriolis force is converted into a detection signal S32 having a voltage level corresponding to the variation in capacitance by the fourth CV conversion circuit 34.

In this case, since the components of the detection signals S31 and S32 output from the third and fourth CV conversion circuits 33 and 34, respectively, which are produced by the Coriolis force have opposite phases, the detection signals S31 and S32 are amplified and converted into one detection signal S3 in the downstream second differential amplifier circuit 42. The detection signal S3 is subjected to noise reduction in the filter circuit 52 to remove unnecessary noise components and is supplied to the synchronization detection circuit 61 as the detection signal S5.

The monitor signal passing through the phase adjustment circuit 60 is supplied to the downstream synchronization detection circuit 61 as the detection reference signal S4. The synchronization detection circuit 61 performs the synchronization detection on the detection signal S5 passing through the filter circuit 52 with the detection reference signal S4. Both of the signals S4 and S5 are modified to have, for example, the same phase (or opposite phases) by the phase adjustment circuit 60. In this case, a detection signal S7 output from the synchronization detection circuit 61 after the synchronization detection has a shape resulting from normal half-wave rectification. Smoothing the detection signal S7 in the smoothing circuit 62 gives a detection signal S8 having a desired voltage level corresponding to the magnitude of the angular velocity. The detection signal S8 is amplified in the downstream amplifier circuit 63 and is then output. The detection signal subjected to amplification in the amplifier circuit 63 is supplied to the downstream output adjustment circuit 64 in which the effect of a temperature drift and the effect of a change in temperature on the sensitivity are removed and is then supplied to an arithmetic circuit (not shown) that calculates the actual angular velocity.

Figure 4:
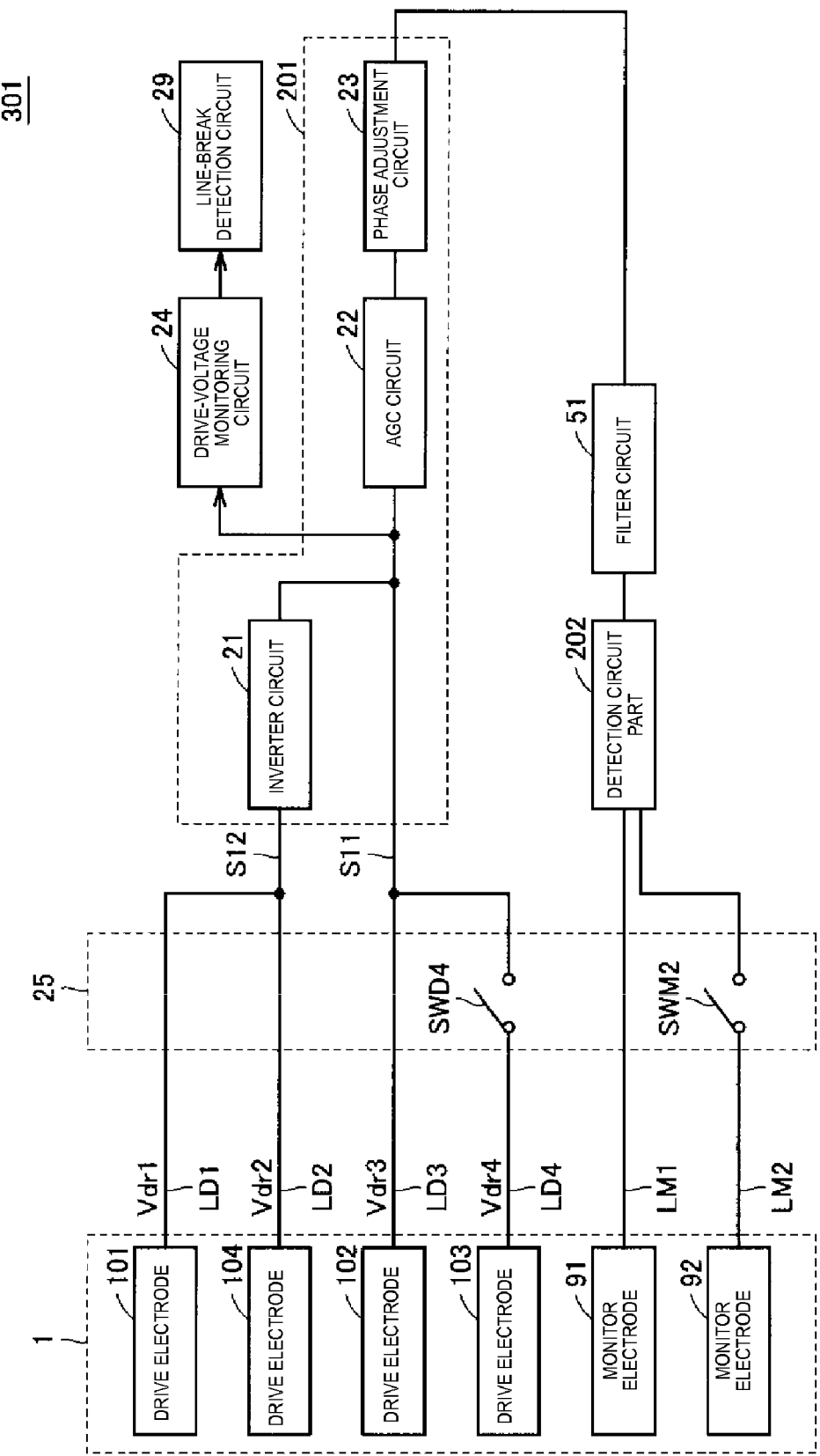
FIG. 4 is a diagram showing the connections between the oscillator according to the first preferred embodiment of the present invention and circuits driving the oscillator.

FIG. 4 is a diagram showing the connections between the oscillator according to the first preferred embodiment of the present invention and the circuits driving the oscillator.

Referring to FIG. 4, an external-force detecting apparatus 301 includes a drive-voltage monitoring circuit 24, a switching circuit 25, a line-break detection circuit 29, drive lines LD1 to LD4, and monitor lines LM1 and LM2. The switching circuit 25 includes switches SWD4 and SWM2.

The drive line LD1 is arranged to connect the first drive electrode 101 to the inverter circuit 21 in the drive circuit portion 201. The drive line LD2 is arranged to connect the drive electrode 104 to the inverter circuit 21 in the drive circuit portion 201. The drive line LD3 is arranged to connect the drive electrode 102 to the AGC circuit 22 in the drive circuit portion 201. The drive line LD4 is arranged to connect the drive electrode 103 to the AGC circuit 22 in the drive circuit portion 201.

The drive signal S12 output from the inverter circuit is supplied to the first drive electrode 101 through the drive line LD1 as a drive voltage Vdr1. The drive signal S12 output from the inverter circuit 21 is supplied to the drive electrode 104 through the drive line LD2 as a drive voltage Vdr2. The drive signal S11 output from the AGC circuit 22 is supplied to the drive electrode 102 through the drive line LD3 as a drive voltage Vdr3. The drive signal S11 output from the AGC circuit 22 is supplied to the drive electrode 103 through the drive line LD4 as a drive voltage Vdr4.

The monitor line LM1 is arranged to connect the first monitor electrode 91 to the detection circuit portion 202. The monitor line LM2 is arranged to connect the monitor electrode 92 to the detection circuit portion 202.

The switch SWD4 is connected between the drive electrode 103 and the AGC circuit 22 and switches between the connection and disconnection of an electric path between the drive electrode 103 and the AGC circuit 22 through the drive line LD4.

The switch SWM2 is connected between the monitor electrode 92 and the detection circuit portion 202 and switches between the connection and disconnection of an electric path between the monitor electrode 92 and the detection circuit portion 202 through the monitor line LM2. The switches can preferably be provided to simplify the configuration of the switching circuit 25.

The drive-voltage monitoring circuit 24 monitors the level of the drive signal S11 output from the AGC circuit 22.

Next, an operation of the external-force detecting apparatus according to the first preferred embodiment of the present invention in order to detect a break of a line will be described. The detection of the break of the drive lines LD1 to LD4 is first described.

FIG. 5 is a flowchart showing an operational process when the external-force detecting apparatus according to the first preferred embodiment of the present invention detects the break of a line.

Referring to FIG. 5, the driving unit 251 drives the oscillator 1 by supplying the drive signals S11 and S12 to the drive electrodes 101 to 104 in the manner described above and controls the amplitude of the drive signals S11 and S12 based on the oscillation state of the oscillator 1 that is obtained from the monitor electrodes 91 and 92 (Step S10).

Next, the drive-voltage monitoring circuit 24 measures the amplitude of the drive signal S11 before the electric path between the oscillator 1 and the drive circuit portion 201 through the drive line LD4 is disconnected (Step S20).

Next, the switching circuit 251 disconnects the electric path between the oscillator 1 and the drive circuit portion 201 through the drive line LD4, among the drive lines LD1 to LD4 (Step S30).

Next, the drive-voltage monitoring circuit 24 measures the amplitude of the drive signal S11 after the electric path is disconnected (Step S40).

Next, the line-break detection circuit 29 detects the break of the drive lines LD1 to LD4 based on the amplitude of each drive signal measured before and after the disconnection of the electric path (Step S50).

FIG. 6 is a diagram showing the relationship between broken drive lines and the levels of a drive signal. It is assumed here that the amplitude of the drive signal S11 when none of the drive lines LD1 to LD4 is broken is equal to one and that the switch SWM2 is turned on.

Referring to FIG. 6, the switch SWD4 is turned off in a state in which the oscillator in the external-force detecting apparatus 301 is being oscillated.

If none of the drive lines LD1 to LD4 is broken, turning off the switch SWD4 causes the amplitude of the monitor signal received by the AGC circuit 22 to be about ¾. Accordingly, the AGC circuit 22 changes the amplitude of the drive signal S11 to about 4/3. In other words, the level of the drive signal S11 after the switch SWD4 is turned off becomes about 4/3 times the level of the drive signal S11 before the switch SWD4 is turned off.

If the drive line LD1, among the drive lines LD1 to LD4, is broken, the amplitude of the drive signal S11 before the switch SWD4 is turned off is about 4/3. Turning off the switch SWD4 causes the amplitude of the monitor signal received by the AGC circuit 22 to be about ⅔. Accordingly, the AGC circuit 22 changes the amplitude of the drive signal S11 to about two. In other words, the level of the drive signal S11 after the switch SWD4 is turned off becomes about 3/2 times the level of the drive signal S11 before the switch SWD4 is turned off.

If the drive line LD2 or the drive line LD3, among the drive lines LD1 to LD4, is broken, the level of the drive signal S11 after the switch SWD4 is turned off becomes about 3/2 times the level of the drive signal S11 before the switch SWD4 is turned off, as in the case in which the drive line LD1 is broken.

If the drive line LD4, among the drive lines LD1 to LD4, is broken, the amplitude of the drive signal S11 before the switch SWD4 is turned off is about 4/3. Turning off the switch SWD4 does not change the amplitude of the monitor signal received by the AGC circuit 22. Accordingly, the AGC circuit 22 does not change the amplitude of the drive signal S11. In other words, the level of the drive signal S11 is not substantially changed before and after the switch SWD4 is turned off.

As described above, measuring the change in level of the drive signal S11 before and after the switch SWD4 is turned off enables the presence of the break of the drive lines LD1 to LD4 to be effectively detected. In addition, it is possible to determine whether the drive line LD4 is broken or whether any of the drive lines LD1 to LD3 is broken.

Next, the detection of the break of the monitor lines LM1 and LM2 will be described.

FIG. 7 is a diagram showing the relationship between broken monitor lines and the levels of the drive signal. It is assumed here that the amplitude of the drive signal S11 when none of the monitor lines LM1 and LM2 is broken is equal to one and that the switch SWD4 is turned on.

Referring to FIG. 7, the switch SWM2 is turned off in a state in which the oscillator in the external-force detecting apparatus 301 is being oscillated.

If none of the monitor lines LM1 and LM2 is broken, turning off the switch SWM2 causes the amplitude of the monitor signal received by the AGC circuit 22 to be about ½. Accordingly, the AGC circuit 22 changes the amplitude of the drive signal S11 to two. In other words, the level of the drive signal S11 after the switch SWM2 is turned off becomes twice the level of the drive signal S11 before the switch SWM2 is turned off.

If the monitor line LM1, among the monitor lines LM1 and LM2, is broken, the amplitude of the drive signal S11 before the switch SWM2 is turned off is two. Turning off the switch SWM2 causes the amplitude of the monitor signal received by the AGC circuit 22 to be zero. Accordingly, the AGC circuit 22 changes the amplitude of the drive signal S11 to, for example, zero. In other words, the drive signal S11 is not output after the switch SWM2 is turned off.

If the monitor line LM2, among the monitor lines LM1 and LM2, is broken, the amplitude of the drive signal S11 before the switch SWM2 is turned off is two. Turning off the switch SWM2 does not change the amplitude of the monitor signal received by the AGC circuit 22. Accordingly, the AGC circuit 22 does not change the amplitude of the drive signal S11. In other words, the level of the drive signal S11 is not changed before and after the switch SWM2 is turned off.

As described above, measuring the change in level of the drive signal S11 before and after the switch SWM2 is turned off enables the presence of the break of the monitor lines LM1 and LM2 to be effectively detected. In addition, it is possible to determine which of the monitor lines LM1 and LM2 is broken.

Here, if the oscillator includes, for example, two drive electrodes in the external-force detecting apparatus, with a method of simply measuring the level of the drive signal output from the drive circuit portion, it is not possible to identify whether the drive line or the monitor line is broken or whether a fault occurs in another portion in the external-force detecting apparatus even if the measurement shows that the drive signal has a level twice the normal level. Also, with a method of comparing the level of the drive signal measured with the oscillator being connected to a test apparatus with the level of the drive signal measured with the oscillator being connected to the target external-force detecting apparatus, it is not possible to identify the break of the drive line or the monitor line in the target external-force detecting apparatus although it is possible to estimate the break thereof.

However, in the external-force detecting apparatus according to the first preferred embodiment of the present invention, a portion of the electric path between each drive electrode and the drive circuit portion or a portion of the electric path between each monitor electrode and the detection circuit portion is intentionally disconnected to measure the levels of the drive signal before and after the disconnection. Such a configuration enables the presence of the break of the drive line and the monitor line and the broken portion to be accurately identified.

When the drive lines LD1 to LD4 and the monitor lines LM1 and LM2 are made by wire bonding, these lines are likely to be broken. In such a case, preferred embodiments of the present invention provide a big advantage in that the break of a line can be accurately detected. However, preferred embodiments of the present invention are also applicable to a case in which the drive lines LD1 to LD4 and the monitor lines LM1 and LM2 are formed by flip chip bonding.

Although the vibrating gyroscope including the electrostatic drive/capacitance detection oscillator 1 is described as the external-force detecting apparatus according to the first preferred embodiment of the present invention, the present invention is not limited thereto. For example, preferred embodiments of the present invention are applicable to a vibrating gyroscope including a tuning bar vibrator made of a monocrystal piezoelectric material and a vibrating gyroscope including a tuning fork vibrator.

Another preferred embodiment of the present invention will now be described with reference to the drawings. The same reference numerals are used to identify the same or equivalent components in the drawings. A description of such components is not repeated.

Second Preferred Embodiment

A second preferred embodiment of the present invention includes additional switches as compared to the external-force detecting apparatus according to the first preferred embodiment. The external-force detecting apparatus according to the second preferred embodiment is similar to the external-force detecting apparatus according to the first preferred embodiment, except for the features discussed below.

Figure 8:
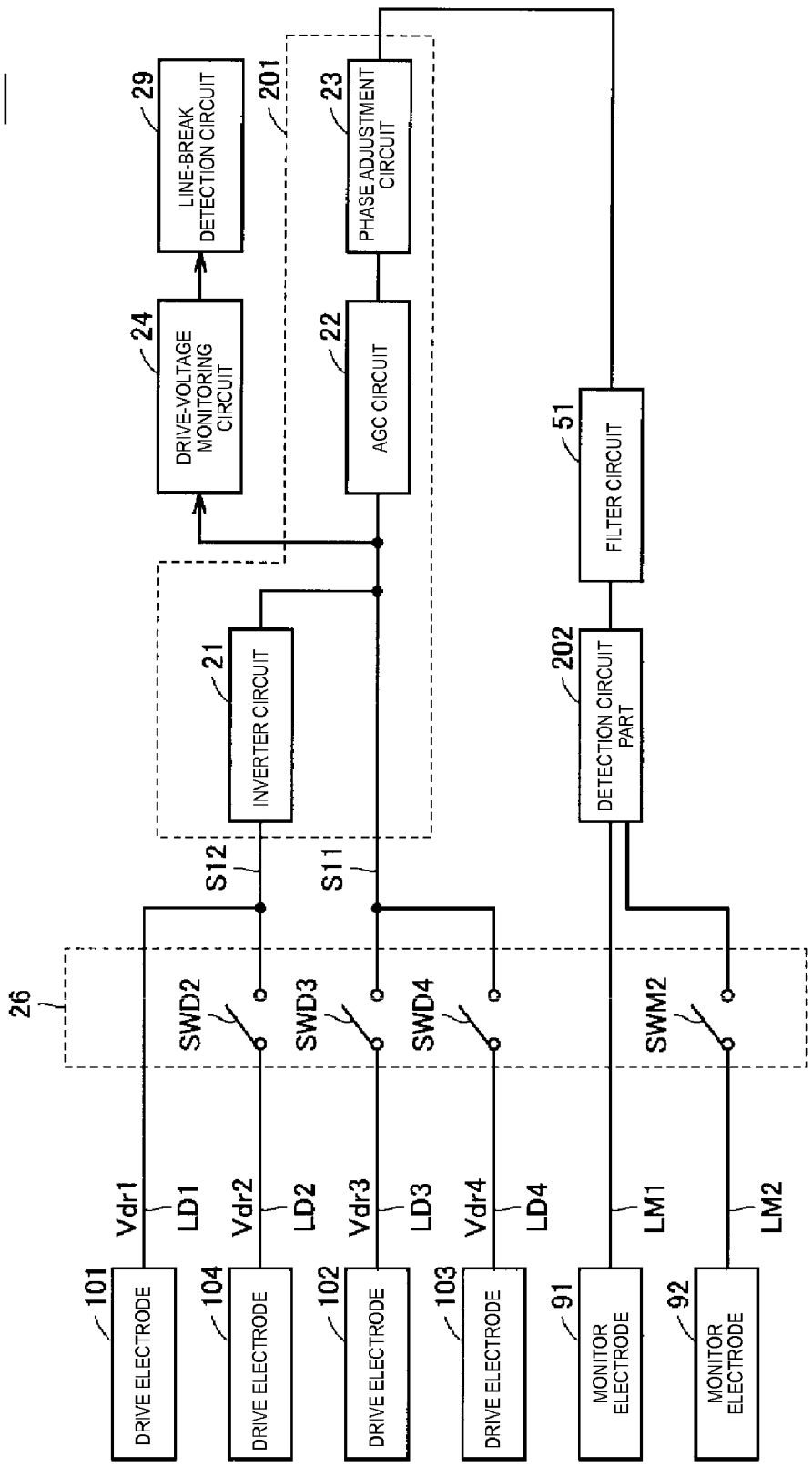
FIG. 8 is a diagram showing the connections between an oscillator according to a second preferred embodiment of the present invention and circuits driving the oscillator.

FIG. 8 is a diagram showing the connections between an oscillator according to the second preferred embodiment of the present invention and the circuits driving the oscillator.

Referring to FIG. 8, an external-force detecting apparatus 302 includes a switching circuit 26, instead of the switching circuit 25 in the external-force detecting apparatus according to the first preferred embodiment of the present invention. The switching circuit 26 includes switches SWD2 to SWD4 and SWM2.

The switch SWD2 is connected between the drive electrode 104 and the AGC circuit 22 and switches between the connection and disconnection of an electric path between the drive electrode 104 and the AGC circuit 22 through the drive line LD2.

The switch SWD3 is connected between the drive electrode 102 and the AGC circuit 22 and switches between the connection and disconnection of an electric path between the drive electrode 102 and the AGC circuit 22 through the drive line LD3.

Next, an operation of the external-force detecting apparatus according to the second preferred embodiment of the present invention to detect the break of the drive lines LD1 to LD4 will be described.

FIG. 9 is a diagram showing the relationship between broken drive lines and the levels of the drive signal. It is assumed here that the amplitude of the drive signal S11 when none of the drive lines LD1 to LD4 is broken is equal to one and that the switch SWM2 is turned on.

Referring to FIG. 9, the switches SWD3 and SWD4 are turned off in a state in which the oscillator in the external-force detecting apparatus 302 is being oscillated.

If none of the drive lines LD1 to LD4 is broken, turning off the switches SWD3 and SWD4 causes the amplitude of the monitor signal received by the AGC circuit 22 to be about ½. Accordingly, the AGC circuit 22 changes the amplitude of the drive signal S11 to about two. In other words, the level of the drive signal S11 after the switches SWD3 and SWD4 are turned off becomes about twice the level of the drive signal S11 before the switches SWD3 and SWD4 are turned off.

If the drive line LD1, among the drive lines LD1 to LD4, is broken, the amplitude of the drive signal S11 before the switches SWD3 and SWD4 are turned off is about 4/3. Turning off the switches SWD3 and SWD4 causes the amplitude of the monitor signal received by the AGC circuit 22 to be about ⅓. Accordingly, the AGC circuit 22 changes the amplitude of the drive signal S11 to about four. In other words, the level of the drive signal S11 after the switches SWD3 and SWD4 are turned off becomes about three times the level of the drive signal S11 before the switches SWD3 and SWD4 are turned off.

If the drive line LD2, among the drive lines LD1 to LD4, is broken, the level of the drive signal S11 after the switches SWD3 and SWD4 are turned off becomes about three times the level of the drive signal S11 before the switches SWD3 and SWD4 are turned off, as in the case in which the drive line LD1 is broken.

If the drive line LD3, among the drive lines LD1 to LD4, is broken, the amplitude of the drive signal S11 before the switches SWD3 and SWD4 are turned off is about 4/3. Turning off the switches SWD3 and SWD4 causes the amplitude of the monitor signal received by the AGC circuit 22 to be about ⅔. Accordingly, the AGC circuit 22 changes the amplitude of the drive signal S11 to about two. In other words, the level of the drive signal S11 after the switches SWD3 and SWD4 are turned off becomes about 3/2 times the level of the drive signal S11 before the switches SWD3 and SWD4 are turned off.

If the drive line LD4, among the drive lines LD1 to LD4, is broken, the level of the drive signal S11 after the switches SWD3 and SWD4 are turned off becomes about 3/2 times the level of the drive signal S11 before the switches SWD3 and SWD4 are turned off, as in the case in which the drive line LD3 is broken.

As described above, measuring the change in level of the drive signal S11 before and after the switches SWD3 and SWD4 are turned off enables the presence of the break of the drive lines LD1 to LD4 to be effectively detected. In addition, it is possible to determine whether the drive line LD1 or LD2 is broken or whether the drive line LD3 or LD4 is broken.

FIG. 10 is a diagram showing the relationship between broken drive lines and the levels of the drive signal, which shows an example of a method of determining which of the drive lines LD1 and LD2 is broken after the detection of the break shown in FIG. 9 is performed.

Referring to FIG. 10, if it is determined that the drive line LD1 or LD2 is broken in the detection of the break shown in FIG. 9, the switch SWD2 is turned off, in addition to the switches SWD3 and SWD4.

If the drive line LD1, among the drive lines LD1 to LD4, is broken, the amplitude of the drive signal S11 before the switches SWD2 to SWD4 are turned off is about 4/3. Turning off the switches SWD2 to SWD4 causes the amplitude of the monitor signal received by the AGC circuit 22 to be zero. Accordingly, the AGC circuit 22 changes the amplitude of the drive signal S11 to, for example, zero. In other words, the drive signal S11 is not output after the switches SWD2 to SWD4 are turned off.

If the drive line LD2, among the drive lines LD1 to LD4, is broken, the amplitude of the drive signal S11 before the switches SWD2 to SWD4 are turned off is about 4/3. Turning off the switches SWD2 to SWD4 causes the amplitude of the monitor signal received by the AGC circuit 22 to be about 1/3. Accordingly, the AGC circuit 22 changes the amplitude of the drive signal S11 to about four. In other words, the level of the drive signal S11 after the switches SWD2 to SWD4 are turned off becomes about three times the level of the drive signal S11 before the switches SWD2 to SWD4 are turned off.

As described above, measuring the change in level of the drive signal S11 before and after the switches SW2 to SWD4 are turned off enables the determination of which of the drive lines LD1 and LD2 is broken to be performed.

If none of the drive lines LD1 to LD4 is broken, turning off the switches SWD2 to SWD4 causes the amplitude of the monitor signal received by the AGC circuit 22 to be about 1/3. Accordingly, the AGC circuit 22 changes the amplitude of the drive signal S11 to about four. In other words, the level of the drive signal S11 after the switches SWD2 to SWD4 are turned off becomes about four times the level of the drive signal S11 before the switches SWD2 to SWD4 are turned off.

If the drive line LD3 or LD4, among the drive lines LD1 to LD4, is broken, the level of the drive signal S11 after the switches SWD2 to SWD4 are turned off becomes about three times the level of the drive signal S11 before the switches SWD2 to and SWD4 are turned off, as in the case in which the drive line LD2 is broken.

FIG. 11 is a diagram showing the relationship between broken drive lines and the levels of the drive signal, which shows another example of the method of determining which of the drive lines LD1 and LD2 is broken after the detection of the break shown in FIG. 9 is performed.

Referring to FIG. 11, if it is determined that the drive line LD1 or LD2 is broken in the detection of the break shown in FIG. 9, it is possible to determine which of the drive lines LD1 and LD2 is broken by turning on and off the switch SWD2 with the switches SWD3 and SWD4 turned on. Specifically, the level of the drive signal S11 after the switch SWD2 is turned off becomes about 3/2 times the level of the drive signal S11 before the switch SWD2 is turned off if the drive line LD1 is broken and the level of the drive signal S11 is not substantially changed before and after the switch SWD2 is turned off if the drive line LD2 is broken. Accordingly, it is possible to determine which of the drive lines LD1 and LD2 is broken.

If it is determined that the drive line LD3 or LD4 is broken in the detection of the break shown in FIG. 9, it is possible to determine which of the drive lines LD3 and LD4 is broken by turning on and off the switch SWD4 with the switches SWD2 and SWD3 turned on.

In addition, it is possible to determine which of the drive lines LD3 and LD4 is broken by turning on and off the switch SWD3 with the switches SWD2 and SWD4 turned on.

Consequently, it is possible to identify the drive line that is broken, among the drive lines LD1 to LD4, in the external-force detecting apparatus according to the second preferred embodiment of the present invention. Specifically, when N drive lines or monitor lines are provided, where N is a natural number that is not less than two, N−1 switches corresponding to (N−1) lines allows the broken portion in the lines to be identified.

Next, another preferred embodiment of the present invention will now be described with reference to the drawings. The same reference numerals are used to identify the same or equivalent components in the drawings. A description of such components is not repeated.

Third Preferred Embodiment

A third preferred embodiment of the present invention provides a modification of the structure of the oscillator in the external-force detecting apparatus according to the first preferred embodiment. The external-force detecting apparatus according to the third preferred embodiment is similar to the external-force detecting apparatus according to the first preferred embodiment except for the features described below.

Figure 12:
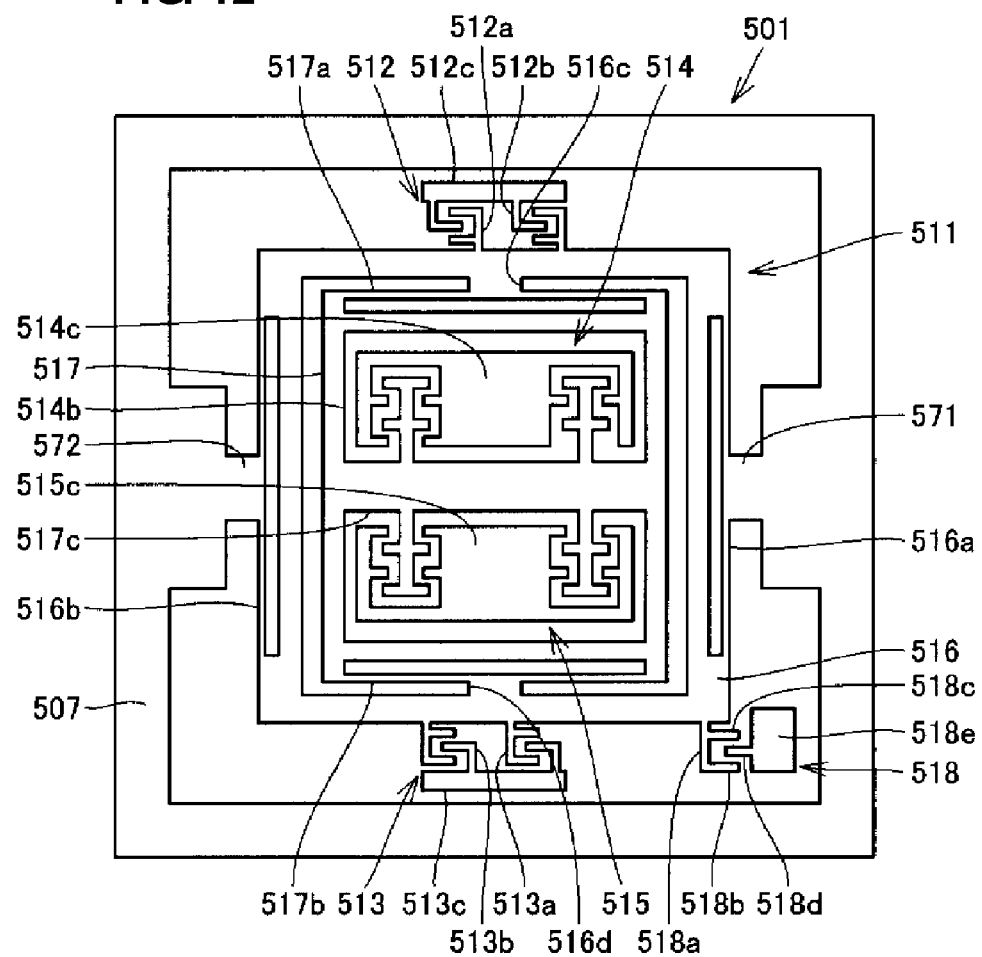
FIG. 12 is a plan view showing the structure of an oscillator used in an external-force detecting apparatus according to a third preferred embodiment of the present invention.

FIG. 12 is a plan view showing the structure of an oscillator used in the external-force detecting apparatus according to the third preferred embodiment of the present invention.

Referring to FIG. 12, in an oscillator 501, supports 571 and 572 that are opposed to each other are provided inside a rectangular support frame 507. An outer-frame oscillating portion 516 of an oscillating body 511 is supported by both ends of outer beams 516a and 516b that are provided at the leading ends of the supports 571 and 572 and that extend in the direction perpendicular or substantially perpendicular to the supporters 571 and 572. Protrusions 516c and 516d are provided at locations perpendicular or substantially perpendicular to the direction connecting the supporter 571 and the supporter 572 inside the outer-frame oscillating portion 516. The protrusions 516c and 516d extend inward and are opposed to each other. Inner beams 517a and 517b extending in the direction perpendicular or substantially perpendicular to the direction in which the outer beams 516a and 516b extend are provided at the leading ends of the protrusions 516c and 516d. An inner-frame oscillating portion 517 is supported at both ends of the inner beams 517a and 517b. A mass portion 517c extending in the direction connecting the supporter 571 and the supporter 572 of the support frame 507 is provided inside the inner-frame oscillating portion 517.

In the outer-frame oscillating portion 516, a drive electrode portion 512 and a drive electrode portion 513 are provided at both outer edges in the direction in which the outer beams 516a and 516b extend. The drive electrode portions 512 and 513 include plated outer-frame movable interdigital electrodes 512a and 513a that are connected with the outer-frame oscillating portion 516, plated outer-frame drive interdigital electrodes 512b and 513b that oppose the outer-frame movable interdigital electrodes 512a and 513a via a micro space, and outer-frame fixed electrodes 512c and 513c supporting the outer-frame drive interdigital electrodes 512b and 513b, respectively. Detection electrode portions 514 and 515 are provided on either side of the mass portion 517c inside the inner-frame oscillating portion 517. The detection electrode portions 514 and 515 include plated inner-frame movable interdigital electrodes 514a and 515a implanted in the mass portion 517c, plated inner-frame detection interdigital electrodes 514b and 515b that oppose the inner-frame movable interdigital electrodes 514a and 515a via a micro space, and inner-frame fixed electrodes 514c and 515c supporting the inner-frame detection interdigital electrodes 514b and 515b, respectively.

Although a supporting base and a cover base of the oscillator 501 are not shown in FIG. 12, the support frame 507, the outer-frame fixed electrodes 512c and 513c, and the inner-frame fixed electrodes 514c and 515c are fixed on the supporting base. A gap is provided between the supporting base and the cover base at the portions at which the remaining supporters 571 and 572, the entire oscillating body 511, and the interdigital electrodes 512, 513, 514, and 515 are provided and the oscillating body 511 is capable of freely oscillating. The cover base is in contact with the support frame 507 and the oscillator 501 is covered with the cover base. The oscillator 501 has a thickness in the direction perpendicular or substantially perpendicular to the drawing. Particularly, the oscillator 501 is configured so that the plated surfaces in the thickness direction oppose each other via a micro space at the portions in which the interdigital electrodes 512a to 515a are provided to produce the electrostatic capacitance. The outer-frame fixed electrodes 512c and 513c and the inner-frame fixed electrodes 514c and 515c are electrically connected to the outside of the supporting base by via holes provided in the supporting base.

A monitor electrode portion 518 is connected with the outer-frame oscillating portion 516 and is arranged adjacent to the drive electrode portion 513. The monitor electrode portion 518 includes plated monitor movable interdigital electrodes 518b and 518c connected to the outer-frame oscillating portion 516 with a plated connecting electrode 518a, a plated monitor fixed interdigital electrode 518d that is provided between the monitor movable interdigital electrode 518b and the monitor movable interdigital electrode 518c and that opposes the monitor movable interdigital electrodes 518b and 518c via a micro space, and a monitor fixed electrode 518e supporting the monitor fixed interdigital electrode 518d.

Figure 13:
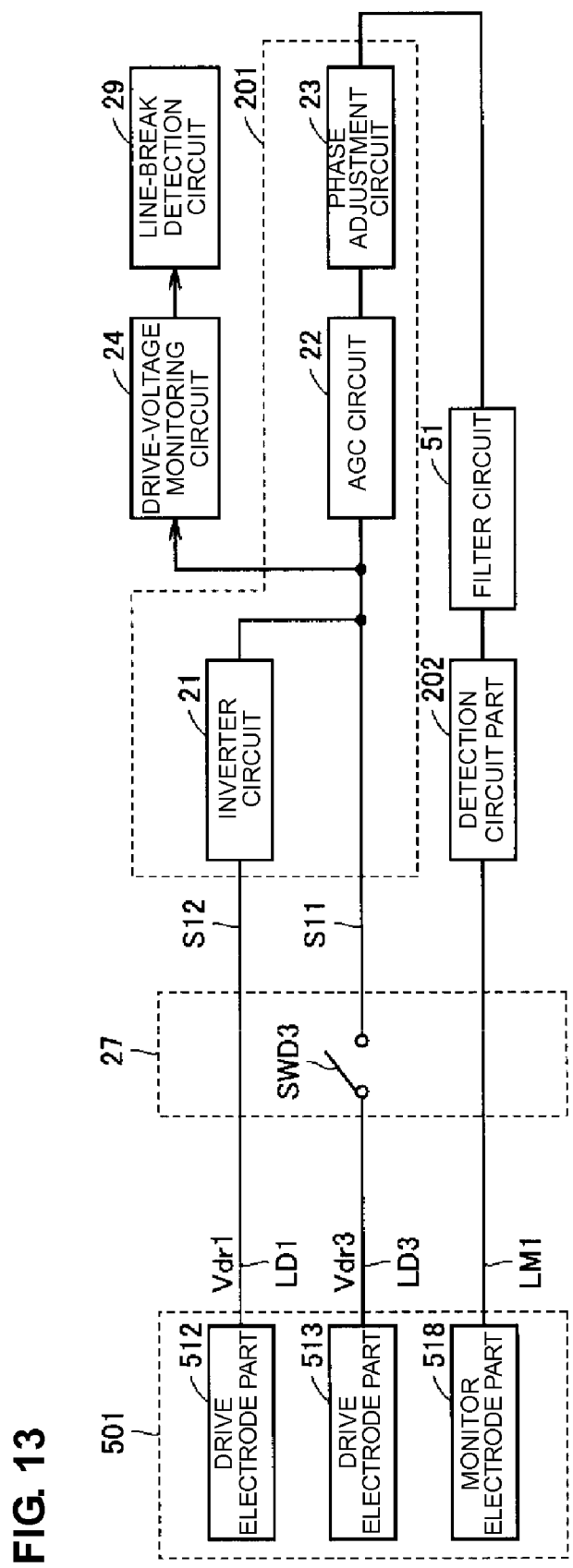
FIG. 13 is a diagram showing the connections between the oscillator according to the third preferred embodiment of the present invention and circuits driving the oscillator.

FIG. 13 is a diagram showing the connections between the oscillator according to the third preferred embodiment of the present invention and the circuits driving the oscillator.

Referring to FIG. 13, an external-force detecting apparatus 303 includes the drive-voltage monitoring circuit 24, a switching circuit 27, the drive lines LD1 and LD3, and the monitor line LM1. The switching circuit 27 includes the switch SWD3.

The drive line LD1 is arranged to connect the drive electrode portion 512 to the inverter circuit 21 in the drive circuit portion 201. The drive line LD3 is arranged to connect the drive electrode portion 513 to the AGC circuit 22 in the drive circuit portion 201.

The drive signal S12 output from the inverter circuit is supplied to the drive electrode portion 512 through the drive line LD1 as the drive voltage Vdr1. The drive signal S11 output from the AGC circuit 22 is supplied to the drive electrode portion 513 through the drive line LD3 as the drive voltage Vdr3.

The monitor line LM1 is used to connect the monitor electrode portion 518 to the detection circuit portion 202.

The switch SWD3 is connected between the drive electrode portion 513 and the AGC circuit 22 and switches between the connection and disconnection of an electric path between the drive electrode portion 513 and the AGC circuit 22 via the drive line LD3.

Next, a case in which the external-force detecting apparatus according to the third preferred embodiment of the present invention detects the break of the drive lines LD1 and LD3 will be described.

Figures 14, 15:
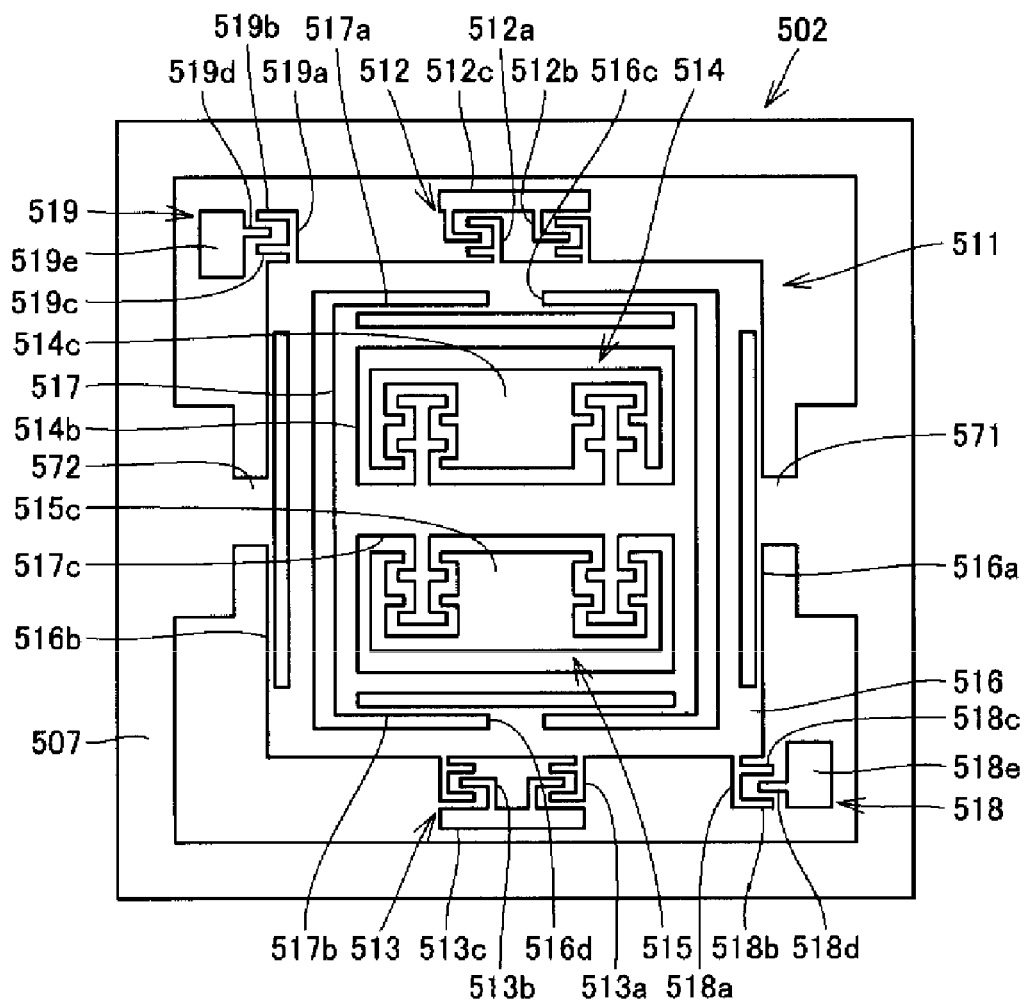
FIG. 14 is a diagram showing the relationship between broken drive lines and the levels of the drive signal.
FIG. 15 is a plan view showing the structure of an oscillator used in an external-force detecting apparatus according to a fourth preferred embodiment of the present invention.

FIG. 14 is a diagram showing the relationship between broken drive lines and the levels of the drive signal. It is assumed here that the amplitude of the drive signal S11 when none of the drive lines LD1 and LD3 is broken is equal to one.

Referring to FIG. 14, the switch SWD3 is turned off in a state in which the oscillator in the external-force detecting apparatus 303 is being oscillated.

If none of the drive lines LD1 and LD3 is broken, turning off the switch SWD3 causes the amplitude of the monitor signal received by the AGC circuit 22 to be about ½. Accordingly, the AGC circuit 22 changes the amplitude of the drive signal S11 to about two. In other words, the level of the drive signal S11 after the switch SWD3 is turned off becomes about twice the level of the drive signal S11 before the switch SWD3 is turned off.

If the drive line LD1, among the drive lines LD1 and LD3, is broken, the amplitude of the drive signal S11 before the switch SWD3 is turned off is about two. Turning off the switch SWD3 causes the amplitude of the monitor signal received by the AGC circuit 22 to be zero. Accordingly, the AGC circuit 22 changes the amplitude of the drive signal S11 to, for example, zero. In other words, the drive signal S11 is not output after the switch SWD3 is turned off.

If the drive line LD3, among the drive lines LD1 and LD3, is broken, the amplitude of the drive signal S11 before the switch SWD3 is turned off is about two. Turning off the switch SWD3 does not substantially change the amplitude of the monitor signal received by the AGC circuit 22. Accordingly, the AGC circuit 22 does not substantially change the amplitude of the drive signal S11. In other words, the level of the drive signal S11 is not changed before and after the switch SWD3 is turned off.

As described above, measuring the change in level of the drive signal S11 before and after the switch SWD3 is turned off enables the presence of the break of the drive lines LD1 and LD3 to be effectively detected. In addition, it is possible to determine which of the drive lines LD1 and LD3 is broken.

Next, another preferred embodiment of the present invention will now be described with reference to the drawings. The same reference numerals are used to identify the same or equivalent components in the drawings. A description of such components is not repeated.

Fourth Preferred Embodiment

A fourth preferred embodiment of the present invention is a modification of the structure of the oscillator in the external-force detecting apparatus according to the third preferred embodiment. The external-force detecting apparatus according to the fourth preferred embodiment is similar to the external-force detecting apparatus according to the third preferred embodiment except for the features described below.

FIG. 15 is a plan view showing the structure of an oscillator used in the external-force detecting apparatus according to the fourth preferred embodiment of the present invention.

Referring to FIG. 15, an oscillator 502 includes a monitor electrode portion 519.

The monitor electrode portion 519 is connected with the outer-frame oscillating portion 516 and is adjacent to the drive electrode portion 512. The monitor electrode portion 519 includes plated monitor movable interdigital electrodes 519b and 519c connected to the outer-frame oscillating portion 516 with a plated connecting electrode 519a, a plated monitor fixed interdigital electrode 519d that is provided between the monitor movable interdigital electrode 519b and the monitor movable interdigital electrode 519c and that opposes the monitor movable interdigital electrodes 519b and 519c via a micro space, and a monitor fixed electrode 519e supporting the monitor fixed interdigital electrode 519d.

Figure 16:
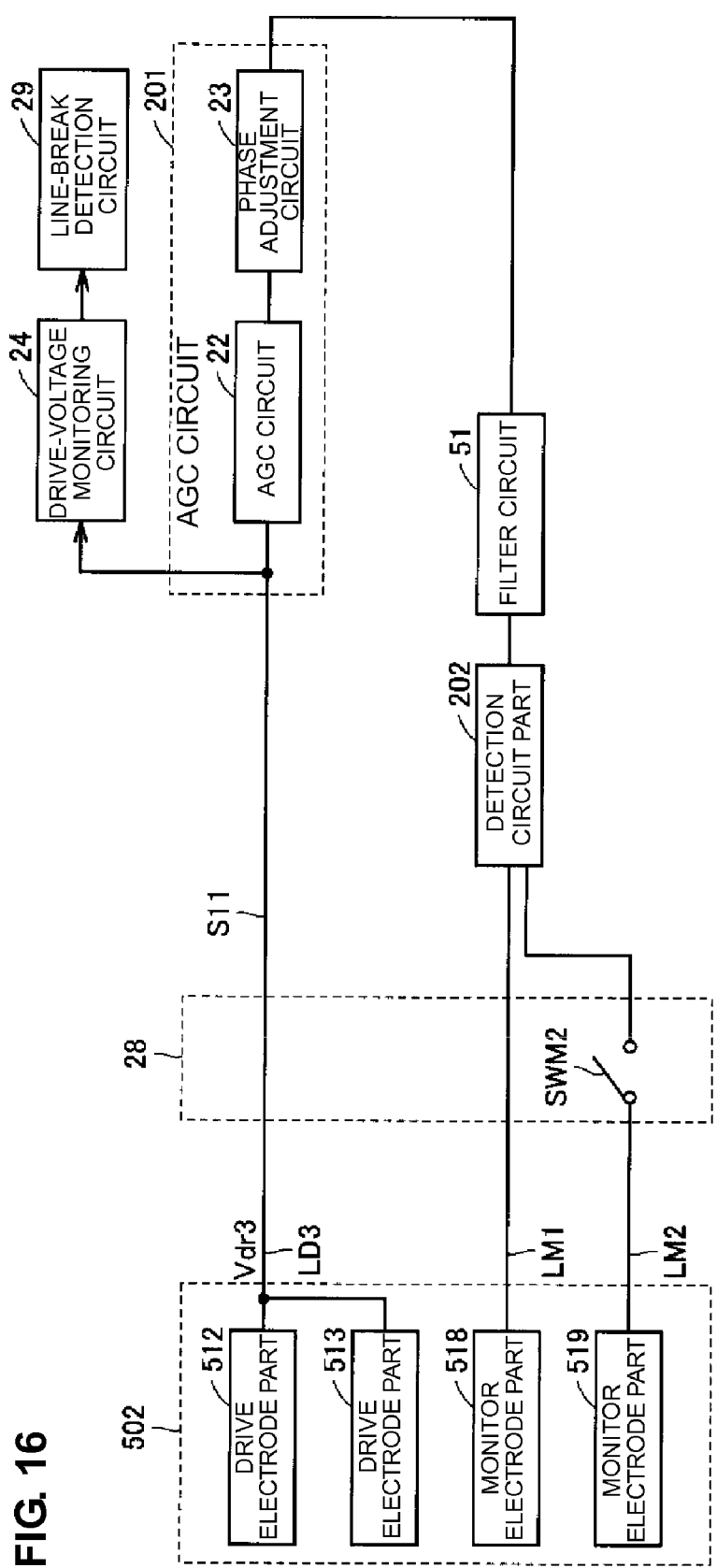
FIG. 16 is a diagram showing the connections between the oscillator according to the fourth preferred embodiment of the present invention and circuits driving the oscillator.

FIG. 16 is a diagram showing the connections between the oscillator according to the fourth preferred embodiment of the present invention and the circuits driving the oscillator.

Referring to FIG. 16, an external-force detecting apparatus 304 includes the drive-voltage monitoring circuit 24, a switching circuit 28, the drive line LD3, and the monitor lines LM1 and LM2. The switching circuit 28 includes the switch SWM2.

The drive electrode portions 512 and 513 are connected with an external electrode (not shown) in the oscillator 502.

The drive line LD3 is arranged to connect the drive electrode portions 512 and 513 to the AGC circuit 22 in the drive circuit portion 201.

The drive signal S11 output from the AGC circuit 22 is supplied to the drive electrode portions 512 and 513 through the drive line LD3 as the drive voltage Vdr3.

The monitor line LM1 is arranged to connect the monitor electrode portion 518 to the detection circuit portion 202. The monitor line LM2 is arranged to connect the monitor electrode portion 519 to the detection circuit portion 202.

The switch SWM2 is connected between the monitor electrode portion 519 and the detection circuit portion 202 and switches between the connection and disconnection of an electric path between the monitor electrode portion 519 and the detection circuit portion 202 via the monitor line LM2.

Since the method of detecting the break of the monitor lines LM1 and LM2 is similar to the method described above with reference to FIG. 7 in the first preferred embodiment of the present invention, a detailed description thereof is not repeated herein.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An external-force detecting apparatus comprising:
    an oscillator including at least one drive electrode and at least one monitor electrode, and at least one of the at least one drive electrode and the at least one monitor electrode includes a plurality of drive electrodes or a plurality of monitor electrodes;
    a driving unit arranged to drive the oscillator;
    at least one drive line provided for each of the at least one drive electrode and arranged to connect each of the at least one drive electrode to the driving unit; and
    at least one monitor line provided for each of the at least one monitor electrode and arranged to connect each of the at least one monitor electrode to the driving unit; wherein
    the driving unit is arranged to output a drive signal to each of the at least one drive electrode through the at least one drive line to drive the oscillator and to perform automatic gain control to a level of the drive signal based on an oscillation state of the oscillator acquired from each of the at least one monitor electrode through the at least one monitor line, the external-force detecting apparatus further comprising:
    a first switching circuit arranged to switch between connection and disconnection of an electric path between the oscillator and the driving unit via the drive lines or the monitor lines connected to the plurality of drive electrodes or the plurality of monitor electrodes of the at least one of the at least one drive electrode and the at least one monitor electrode that includes the plurality of drive electrodes or the plurality of monitor electrodes.

2. The external-force detecting apparatus according to claim 1, wherein
    the oscillator includes a plurality of the drive electrodes and a plurality of the monitor electrodes; and
    the first switching circuit is arranged to switch between connection and disconnection of an electric path between the oscillator and the driving unit via at least one of the drive lines, the external-force detecting apparatus further comprising:
    a second switching circuit arranged to switch between connection and disconnection of an electric path between the oscillator and the driving unit via at least one of the monitor lines.

3. The external-force detecting apparatus according to claim 1, wherein
    at least one of the drive electrodes and the monitor electrodes includes N drive electrodes or N monitor electrodes, where N is a natural number that is not less than two; and
    the first switching circuit is arranged to switch between connection and disconnection of an electric path between the oscillator and the driving unit via N−1 lines, among the drive lines or the monitor lines of the N drive electrodes or the N monitor electrodes.

4. The external-force detecting apparatus according to claim 1, wherein the first switching circuit includes a switch arranged to switch between connection and disconnection of the electric path.

5. The external-force detecting apparatus according to claim 1, wherein the drive lines and the monitor lines are defined by wire bonding.

6. A method of detecting line break in an external-force detecting apparatus including an oscillator including at least one drive electrode and at least one monitor electrode, and at least one of the at least one drive electrode and the at least one monitor electrode includes a plurality of drive electrodes or a plurality of monitor electrodes, a driving unit arranged to drive the oscillator, at least one drive line provided for each of the at least one drive electrode and arranged to connect the at least one drive electrode to the driving unit, and at least one monitor line provided for each of the at least one monitor electrode and arranged to connect the at least one monitor electrode to the driving unit, the method comprising the steps of:
    outputting a drive signal to the at least one drive electrode through the at least one drive line to drive the oscillator and performing automatic gain control to a level of the drive signal based on the oscillation state of the oscillator acquired from the at least one monitor electrode through the monitor lines by the driving unit;

measuring a level of the drive signal;

disconnecting an electric path between the oscillator and the driving unit via the drive lines or the monitor lines connected to the plurality of drive electrodes or the plurality of monitor electrodes of the at least one of the at least one drive electrode and the at least one monitor electrode that includes the plurality of drive electrodes or the plurality of monitor electrodes;

measuring the level of the drive signal after the disconnection of the electric path; and detecting a break of one of the drive lines or the monitor lines connected to the plurality of drive electrodes or the plurality of monitor electrodes of the at least one of the at least one drive electrode and the at least one monitor electrode that includes the plurality of drive electrodes or the plurality of monitor electrodes based on a level of the drive signal measured before and after the disconnection of the electric path.

* * * * *